(12) United States Patent
Sinha et al.

(10) Patent No.: US 12,322,129 B2
(45) Date of Patent: Jun. 3, 2025

(54) CAMERA LOCALIZATION

(71) Applicant: Microsoft Technology Licensing, LLC, Redmond, WA (US)

(72) Inventors: Sudipta Narayan Sinha, Kirkland, WA (US); Ondrej Miksik, Zurich (CH); Joseph Michael Degol, Seattle, WA (US); Tien Do, Minneapolis, MN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 507 days.

(21) Appl. No.: 17/592,500

(22) Filed: Feb. 3, 2022

(65) Prior Publication Data

US 2023/0154032 A1 May 18, 2023

Related U.S. Application Data

(60) Provisional application No. 63/279,614, filed on Nov. 15, 2021.

(51) Int. Cl.
*G06T 7/70* (2017.01)
*G06V 10/774* (2022.01)
(Continued)

(52) U.S. Cl.
CPC ............ *G06T 7/70* (2017.01); *G06V 10/7747* (2022.01); *G06V 10/7784* (2022.01);
(Continued)

(58) Field of Classification Search
CPC ............. G06T 7/70; G06T 2207/10016; G06T 2207/20081; G06T 2207/20084;
(Continued)

(56) References Cited

U.S. PATENT DOCUMENTS

2018/0189974 A1\* 7/2018 Clark .................. G06N 3/04
2019/0108651 A1\* 4/2019 Gu .................... G06V 10/955
(Continued)

OTHER PUBLICATIONS

Moolan-Feroze, Oliver, and Andrew Calway. "Predicting out-of-view feature points for model-based camera pose estimation." 2018 IEEE/RSJ International Conference on Intelligent Robots and Systems (IROS). IEEE, 2018. (Year: 2018).\*

(Continued)

*Primary Examiner* — Oneal R Mistry
*Assistant Examiner* — Jongbong Nah
(74) *Attorney, Agent, or Firm* — Barta Jones, PLLC

(57) ABSTRACT

In various embodiments there is a method for camera localization within a scene. An image of a scene captured by the camera is input to a machine learning model, which has been trained for the particular scene to detect a plurality of 3D scene landmarks. The 3D scene landmarks are pre-specified in a pre-built map of the scene. The machine learning model outputs a plurality of predictions, each prediction comprising: either a 2D location in the image which is predicted to depict one of the 3D scene landmarks, or a 3D bearing vector, being a vector originating at the camera and pointing towards a predicted 3D location of one of the 3D scene landmarks. Using the predictions, an estimate of a position and orientation of the camera in the pre-built map of the scene is computed.

20 Claims, 8 Drawing Sheets

(51) Int. Cl.
  *G06V 10/778* (2022.01)
  *G06V 20/64* (2022.01)
(52) U.S. Cl.
  CPC .... *G06V 20/64* (2022.01); *G06T 2207/10016* (2013.01); *G06T 2207/20081* (2013.01)
(58) Field of Classification Search
  CPC ............ G06T 2207/30244; G06T 7/74; G06V 10/7747; G06V 10/7784; G06V 20/64; G06V 10/62; G06V 10/771
  See application file for complete search history.

(56) References Cited

U.S. PATENT DOCUMENTS

| | | | | |
|---|---|---|---|---|
| 2020/0301015 | A1* | 9/2020 | Siddiqui | G01S 17/86 |
| 2022/0414932 | A1* | 12/2022 | Chen | G06T 7/579 |
| 2023/0032888 | A1* | 2/2023 | Li | G06V 10/44 |
| 2024/0104773 | A1* | 3/2024 | Altillawi | G06T 7/74 |

OTHER PUBLICATIONS

Lee, Timothy E., et al. "Camera-to-robot pose estimation from a single image." 2020 IEEE International Conference on Robotics and Automation (ICRA). IEEE, 2020. (Year: 2020).*
Tremblay, Jonathan, et al. "Indirect object-to-robot pose estimation from an external monocular rgb camera. In 2020 IEEE." RSJ International Conference on Intelligent Robots and Systems (IROS). 2020. (Year: 2020).*
Arandjelovic, et al., "NetVLAD: CNN Architecture for Weakly Supervised Place Recognition", In Proceedings of the IEEE Conference on Computer Vision and Pattern Recognition, Jun. 2016, pp. 5297-5307.
Balntas, et al., "RelocNet: Continuous Metric Learning Relocalisation using Neural Nets", In Proceedings of the European Conference on Computer Vision, Sep. 2018, pp. 1-17.
Bay, et al., "Speeded-Up Robust Features (SURF)", In Journal of Computer Vision and Image Understanding, vol. 110, Issue 3, Jun. 2008, pp. 346-359.
Bergamo, et al., "Leveraging Structure from Motion to Learn Discriminative Codebooks for Scalable Landmark Classification", In Proceedings of the IEEE Conference on Computer Vision and Pattern Recognition, Jun. 2013, pp. 763-770.
Brachmann, et al., "DSAC—Differentiable RANSAC for Camera Localization", In Proceedings of the IEEE Conference on Computer Vision and Pattern Recognition, Jul. 2017, pp. 6684-6692.
Brachmann, et al., "Expert Sample Consensus Applied to Camera Re-Localization", In Proceedings of the IEEE/CVF International Conference on Computer Vision, Oct. 2019, pp. 7525-7534.
Brachmann, et al., "Learning Less Is More—6D Camera Localization via 3D Surface Regression", In Proceedings of the IEEE Conference on Computer Vision and Pattern Recognition, Jun. 2018, pp. 4654-4662.
Brachmann, et al., "On the Limits of Pseudo Ground Truth in Visual Camera Re-Localisation", In Proceedings of the IEEE/CVF International Conference on Computer Vision, Oct. 2021, pp. 6218-6228.
Brachmann, et al., "Visual Camera Re-Localization from RGB and RGB-D Images Using DSAC", In Journal of IEEE Transactions on Pattern Analysis and Machine Intelligence, Apr. 2, 2021, pp. 1-18.
Calonder, et al., "Fast Keypoint Recognition Using Random Ferns", In Journal of IEEE Transactions on Pattern Analysis and Machine Intelligence, vol. 32, Issue 3, Mar. 2010, pp. 448-461.
Cao, et al., "Minimal Scene Descriptions from Structure from Motion Models", In Proceedings of the IEEE Conference on Computer Vision and Pattern Recognition, Jun. 2014, 8 Pages.
Cao, et al., "Unifying Deep Local and Global Features for Image Search", In Proceedings of the European Conference on Computer Vision, Nov. 12, 2020, pp. 726-743.
Cheng, et al., "HigherHRNet: Scale-Aware Representation Learning for Bottom-Up Human Pose Estimation", In Proceedings of the IEEE/CVF Conference on Computer Vision and Pattern Recognition, Jun. 2020, pp. 5386-5395.
Chum, et al., "Matching with PROSAC—Progressive Sample Consensus", In Proceedings of the IEEE Computer Society Conference on Computer Vision and Pattern Recognition, Jun. 20, 2005, 7 Pages.
Dai, et al., "ScanNet: Richly-Annotated 3D Reconstructions of Indoor Scenes", In Proceedings of the IEEE Conference on Computer Vision and Pattern Recognition, Jul. 2017, pp. 5828-5839.
Detone, et al., "SuperPoint: Self-Supervised Interest Point Detection and Description", In Proceedings of the IEEE Conference on Computer Vision and Pattern Recognition Workshops, Jun. 2018, pp. 337-349.
Do, et al., "Surface Normal Estimation of Tilted Images via Spatial Rectifier", In Proceedings of the European Conference on Computer Vision, Oct. 29, 2020, pp. 265-280.
Dong, et al., "Supervision by Registration and Triangulation for Landmark Detection", In Journal of IEEE Transactions on Pattern Analysis and Machine Intelligence, vol. 43, Issue 10, Oct. 1, 2021, pp. 3681-3694.
Douze, et al., "Aggregating Local Descriptors into a Compact Image Representation", In Proceedings of the IEEE Computer Society Conference on Computer Vision and Pattern Recognition, Jun. 13, 2010, pp. 3304-3311.
Dusmanu, et al., "D2-Net: A Trainable CNN for Joint Description and Detection of Local Features", In Proceedings of IEEE/CVF Conference on Computer Vision and Pattern Recognition, Jun. 15, 2019, pp. 8084-8093.
Fischler, et al., "Random Sample Consensus: A Paradigm for Model Fitting with Applications to Image Analysis and Automated Cartography", In Journal of Communications of the ACM, vol. 24, Issue 6, Jun. 1, 1981, pp. 381-395.
Hays, et al., "IM2GPS: Estimating Geographic Information from a Single Image", In Proceedings of the IEEE Conference on Computer Vision and Pattern Recognition, Jun. 23, 2008, 8 Pages.
He, et al., "Deep Residual Learning for Image Recognition", In Proceedings of the IEEE Conference on Computer Vision and Pattern Recognition, Jun. 2016, pp. 770-778.
Hyeon, et al., "Pose Correction for Highly Accurate Visual Localization in Large-Scale Indoor Spaces", In Proceedings of the IEEE/CVF International Conference on Computer Vision, Oct. 2021, pp. 15974-15983.
Jin, et al., "Image Matching across Wide Baselines: From Paper to Practice", In International Journal of Computer Vision, vol. 129, Issue 2, Oct. 7, 2020, pp. 517-547.
Johnson, et al., "Billion-Scale Similarity Search with GPUs", In Journal of IEEE Transactions on Big Data, vol. 7, Issue 3, Jun. 7, 2019, pp. 535-547.
Kendall, et al., "Geometric Loss Functions for Camera Pose Regression With Deep Learning", In Proceedings of the IEEE Conference on Computer Vision and Pattern Recognition, Jul. 2017, pp. 5974-5983.
Kendall, et al., "PoseNet: A Convolutional Network for Real-Time 6-DOF Camera Relocalization", In Proceedings of the IEEE International Conference on Computer Vision, Dec. 2015, pp. 2938-2946.
Kingma, et al., "Adam: A Method for Stochastic Optimization", In Repository of arXiv:1412.6980v1, Dec. 22, 2014, pp. 1-9.
Laskar, et al., "Camera Relocalization by Computing Pairwise Relative Poses Using Convolutional Neural Network", In Proceedings of the IEEE International Conference on Computer Vision, Oct. 2017, pp. 929-938.
Lee, et al., "Large-Scale Localization Datasets in Crowded Indoor Spaces", In Proceedings of the IEEE/CVF Conference on Computer Vision and Pattern Recognition, Jun. 2021, pp. 3227-3236.
Lepetit, et al., "Keypoint Recognition using Randomized Trees", In Journal of IEEE Transactions on Pattern Analysis and Machine Intelligence, vol. 28, Issue 9, Sep. 2006, pp. 1465-1479.
Li, et al., "Full-Frame Scene Coordinate Regression for Image-Based Localization", In Proceedings of the Robotics: Science and Systems XIV, Jun. 26, 2018, 9 Pages.

(56) References Cited

OTHER PUBLICATIONS

Li, et al., "Scene Coordinate Regression with Angle-Based Reprojection Loss for Camera Relocalization", In Proceedings of the European Conference on Computer Vision, Sep. 2018, pp. 1-17.
Li, et al., "Worldwide Pose Estimation Using 3D Point Clouds", In Proceedings of the European Conference on Computer Vision, Oct. 7, 2012, pp. 15-29.
Lowe, David G., "Distinctive Image Features from Scale-Invariant Keypoints", In International Journal of Computer Vision, vol. 60, Issue 2, Nov. 2004, pp. 91-110.
Lynen, et al., "Get Out of My Lab: Large-Scale, Real-Time VVisual-Inertial Localization", In Journal of Robotics: Science and Systems, vol. 1, Jul. 13, 2015, 10 Pages.
Maddern, et al., "1 Year, 1000km: The Oxford RobotCar Dataset", In the International Journal of Robotics Research, vol. 36, Issue 1, Nov. 29, 2016, 8 Pages.
Massiceti, et al., "Random forests versus Neural Networks—What's Best for Camera Localization?", In Proceedings of the IEEE International Conference on Robotics and Automation, May 29, 2017, pp. 5118-5125.
Meng, et al., "Backtracking Regression Forests for Accurate Camera Relocalization", In Proceedings of the IEEE/RSJ International Conference on Intelligent Robots and Systems, Sep. 24, 2017, pp. 6886-6893.
Mikolajczyk, et al., "Scale and Affine Invariant Interest Point Detectors", In International Journal of Computer Vision, vol. 60, Oct. 2004, pp. 63-86.
Mishchuk, et al., "Working Hard to Know your Neighbor's Margins: Local Descriptor Learning Loss", In Proceedings of the 31st Neural Information Processing Systems, 2017, 12 Pages.
Muja, et al., "Fast Approximate Nearest Neighbors with Automatic Algorithm Configuration", In Journal of VISAPP, vol. 2, 2009, 10 Pages.
Newcombe, et al., "KinectFusion: Real-Time Dense Surface Mapping and Tracking", In Proceedings of the 10th IEEE International Symposium on Mixed and Augmented Reality, Oct. 26, 2011, pp. 127-136.
Newell, et al., "Stacked Hourglass Networks for Human Pose Estimation", In Proceedings of the European Conference on Computer Vision, Sep. 17, 2016, pp. 483-499.
Ng, et al., "Reassessing the Limitations of CNN Methods for Camera Pose Regression", In the Repository of arXiv:2108.07260v1, Aug. 16, 2021, pp. 1-15.
Park, et al., "3D Point Cloud Reduction Using Mixed-Integer Quadratic Programming", In Proceedings of the IEEE Conference on Computer Vision and Pattern Recognition Workshops, Jun. 2013, pp. 229-236.
Paszke, et al., "PyTorch: An Imperative Style, High-Performance Deep Learning Library", In Proceedings of the 33rd Neural Information Processing Systems, 2019, 12 Pages.
Pavlakos, et al., "6-DoF Object Pose from Semantic Keypoints", In Proceedings of the IEEE International Conference on Robotics and Automation, May 29, 2017, pp. 2011-2018.
Peng, et al., "PVNet: Pixel-Wise Voting Network for 6DoF Pose Estimation", In Proceedings of the IEEE/CVF Conference on Computer Vision and Pattern Recognition, Jun. 2019, pp. 4561-4570.
Do, et al., "Learning to Detect Scene Landmarks for Camera Localization", In Proceedings of IEEE/CVF Conference on Computer Vision and Pattern Recognition (CVPR), Jun. 18, 2022, pp. 11122-11132.
Lee, et al., "Camera-to-Robot Pose Estimation from a Single Image", In Proceedings of IEEE International Conference on Robotics and Automation (ICRA), May 31, 2020, pp. 9426-9432.
Moolan-Feroze, et al., "Predicting Out-of-View Feature Points for Model-Based Camera Pose Estimation", In Proceedings of International Conference on Intelligent Robots and Systems (IROS), Oct. 1, 2018, pp. 82-88.
"International Search Report and Written Opinion Issued in PCT Application No. PCT/US22/043562", Mailed Date: Jan. 5, 2023, 13 Pages.

Tremblay, et al., "Indirect Object-to-Robot Pose Estimation from an External Monocular RGB Camera", In Repository of arXiv:2008.11822, Aug. 26, 2020, 8 Pages.
Zadeh, et al., "Convolutional Experts Constrained Local Model for 3D Facial Landmark Detection", In Proceedings of the IEEE International Conference on Computer Vision, Oct. 2017, pp. 2519-2528.
Persson, et al., "Lambda Twist: An Accurate Fast Robust Perspective Three Point (P3P) Solver", In Proceedings of the European Conference on Computer Vision, Sep. 2018, 15 Pages.
Pion, et al., "Benchmarking Image Retrieval for Visual Localization", In Proceedings of International Conference on 3D Vision, Nov. 25, 2020, pp. 483-494.
Pittaluga, et al., "Revealing Scenes by Inverting Structure From Motion Reconstructions", In Proceedings of the IEEE/CVF Conference on Computer Vision and Pattern Recognition, Jun. 2019, pp. 145-154.
Raguram, et al., "USAC: A Universal Framework for Random Sample Consensus", In Journal of IEEE Transactions on Pattern Analysis and Machine Intelligence, vol. 35, Issue 8, Aug. 2013, pp. 2022-2038.
Rublee, et al., "ORB: An Efficient Alternative to SIFT or SURF", In Proceedings of the International Conference on Computer Vision, Nov. 6, 2011, pp. 2564-2571.
Saha, et al., "Improved Visual Relocalization by Discovering Anchor Points", In Proceedings of the British Machine Vision Conference, Sep. 3, 2018, 11 Pages.
Sarlin, et al., "Back to the Feature: Learning Robust Camera Localization From Pixels to Pose", In Proceedings of the IEEE/CVF Conference on Computer Vision and Pattern Recognition, Jun. 2021, pp. 3247-3257.
Sarlin, et al., "From Coarse to Fine: Robust Hierarchical Localization at Large Scale", In Proceedings of the IEEE/CVF Conference on Computer Vision and Pattern Recognition, Jun. 2019, pp. 12716-12725.
Sarlin, et al., "SuperGlue: Learning Feature Matching With Graph Neural Networks", In Proceedings of the IEEE/CVF Conference on Computer Vision and Pattern Recognition, Jun. 2020, pp. 4938-4947.
Sattler, et al., "Benchmarking 6DOF Outdoor Visual Localization in Changing Conditions", In Proceedings of the IEEE Conference on Computer Vision and Pattern Recognition, Jun. 2018, pp. 8601-8610.
Sattler, et al., "Image Retrieval for Image-Based Localization Revisited", In Proceedings of the British Machine Vision Conference, Sep. 3, 2012, pp. 1-12.
Sattler, et al., "Improving Image-Based Localization by Active Correspondence Search", In Proceedings of the European Conference on Computer Vision, Oct. 7, 2012, pp. 752-765.
Sattler, et al., "Understanding the Limitations of CNN-Based Absolute Camera Pose Regression", In Proceedings of the IEEE/CVF Conference on Computer Vision and Pattern Recognition, Jun. 2019, pp. 3302-3312.
Schonberger, et al., "Comparative Evaluation of Hand-Crafted and Learned Local Features", In Proceedings of the IEEE Conference on Computer Vision and Pattern Recognition, Jul. 2017, pp. 1482-1491.
Schonberger, et al., "Structure-From-Motion Revisited", In Proceedings of the IEEE Conference on Computer Vision and Pattern Recognition, Jun. 2016, pp. 4104-4113.
Shavit, et al., "Learning Multi-Scene Absolute Pose Regression With Transformer", In Proceedings of the IEEE/CVF International Conference on Computer Vision, Oct. 2021, pp. 2733-2742.
Shotton, et al., "Scene Coordinate Regression Forests for Camera Relocalization in RGB-D Images", In Proceedings of the IEEE Conference on Computer Vision and Pattern Recognition, Jun. 2013, pp. 2930-2937.
Simon, et al., "Hand Keypoint Detection in Single Images Using Multiview Bootstrapping", In Proceedings of the IEEE Conference on Computer Vision and Pattern Recognition, Jul. 2017, pp. 1145-1153.
Skydes, "ETH-MS Localization Dataset", Retrieved from: https://github.com/cvg/visloc-iccv2021, Aug. 31, 2021, 6 Pages.

(56) References Cited

OTHER PUBLICATIONS

Speciale, et al., "Privacy Preserving Image Queries for Camera Localization", In Proceedings of the IEEE/CVF International Conference on Computer Vision, Oct. 2019, pp. 1486-1496.

Speciale, et al., "Privacy Preserving Image-Based Localization", In Proceedings of the IEEE/CVF Conference on Computer Vision and Pattern Recognition, Jun. 2019, pp. 5493-5503.

Sun, et al., "Deep High-Resolution Representation Learning for Human Pose Estimation", In Proceedings of the IEEE/CVF Conference on Computer Vision and Pattern Recognition, Jun. 2019, pp. 5693-5703.

Taira, et al., "InLoc: Indoor Visual Localization With Dense Matching and View Synthesis", In Proceedings of the IEEE Conference on Computer Vision and Pattern Recognition, Jun. 2018, pp. 7199-7209.

Tekin, et al., "Real-Time Seamless Single Shot 6D Object Pose Prediction", In Proceedings of the IEEE Conference on Computer Vision and Pattern Recognition, Jun. 2018, pp. 292-301.

Tian, et al., "SOSNet: Second Order Similarity Regularization for Local Descriptor Learning", In Proceedings of the IEEE/CVF Conference on Computer Vision and Pattern Recognition, Jun. 2019, pp. 11016-11025.

Tolias, et al., "To Aggregate or Not to Aggregate: Selective Match Kernels for Image Search", In Proceedings of the IEEE International Conference on Computer Vision, Dec. 2013, pp. 1401-1408.

Torii, et al., "24/7 Place Recognition by View Synthesis", In Proceedings of the IEEE Conference on Computer Vision and Pattern Recognition, Jun. 2015, pp. 1808-1817.

Toshev, et al., "DeepPose: Human Pose Estimation via Deep Neural Networks", In Proceedings of the IEEE Conference on Computer Vision and Pattern Recognition, Jun. 2014, 8 Pages.

Valentin, et al., "Exploiting Uncertainty in Regression Forests for Accurate Camera Relocalization", In Proceedings of the IEEE Conference on Computer Vision and Pattern Recognition, Jun. 2015, pp. 4400-4408.

Wald, et al., "Beyond Controlled Environments: 3D Camera Re-Localization in Changing Indoor Scenes", In Proceedings of the European Conference on Computer Vision, Nov. 9, 2020, pp. 467-487.

Wang, et al., "AtLoc: Attention Guided Camera Localization", In Proceedings of the AAAI Conference on Artificial Intelligence, vol. 34, Issue 06, Apr. 3, 2020, pp. 10393-10401.

Wang, et al., "Continual Learning for Image-Based Camera Localization", In Proceedings of the IEEE/CVF International Conference on Computer Vision, Oct. 2021, pp. 3252-3262.

Wei, et al., "Convolutional Pose Machines", In Proceedings of the IEEE Conference on Computer Vision and Pattern Recognition, Jun. 2016, pp. 4724-4732.

Weinzaepfel, et al., "Visual Localization by Learning Objects-Of-Interest Dense Match Regression", In Proceedings of the IEEE/CVF Conference on Computer Vision and Pattern Recognition, Jun. 2019, pp. 5634-5643.

Wenzel, et al., "4Seasons: A Cross-Season Dataset for Multi-Weather SLAM in Autonomous Driving", In Proceedings of the DAGM German Conference on Pattern Recognition, Sep. 28, 2020, pp. 404-417.

Weyand, et al., "PlaNet—Photo Geolocation with Convolutional Neural Networks", In Proceedings of the European Conference on Computer Vision, Sep. 17, 2016, pp. 37-55.

Xiao, et al., "Simple Baselines for Human Pose Estimation and Tracking", In Proceedings of the European Conference on Computer Vision, Sep. 2018, 16 Pages.

Xu, et al., "AnchorFace: An Anchor-based Facial Landmark Detector Across Large Poses", In Proceedings of the Association for the Advancement of Artificial Intelligence, Jan. 13, 2021, pp. 3092-3100.

Xue, et al., "Learning Multi-View Camera Relocalization With Graph Neural Networks", In Proceedings of IEEE/CVF Conference on Computer Vision and Pattern Recognition, Jun. 13, 2020, pp. 11372-11381.

Yang, et al., "SANet: Scene Agnostic Network for Camera Localization", In Proceedings of the IEEE/CVF International Conference on Computer Vision, Oct. 2019, pp. 42-51.

Yi, et al., "LIFT: Learned Invariant Feature Transform", In Proceedings of European Conference on Computer Vision, Sep. 17, 2016, pp. 467-483.

Yu, et al., "Multi-Scale Context Aggregation by Dilated Convolutions", In Repository of arXiv:1511.07122v1, Nov. 23, 2015, pp. 1-9.

Badino, et al., "Visual Localization Data Set", Retrieved from: https://web.archive.org/web/20150219124350/http://3dvis.ri.cmu.edu:80/data-sets/localization/, 2011, 8 Pages.

* cited by examiner

CAMERA LOCALIZATION

CROSS-REFERENCE TO RELATED APPLICATION

This application claims the benefit of U.S. provisional application No. 63/279,614 filed on Nov. 15, 2021, entitled "Camera Localization" the entirety of which is hereby incorporated by reference herein.

BACKGROUND

Camera localization is the problem of determining the position and orientation, typically in three dimensions, of a camera from video or images captured by the camera. The position and orientation is often with respect to a pre-built scene map where the camera is in the scene.

Camera localization is difficult to achieve accurately and robustly especially using resource constrained devices such as mobile phones, wearable computers, mobile robots, drones and other resource constrained devices.

The embodiments described below are not limited to implementations which solve any or all of the disadvantages of known camera localization methods.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various embodiments there is a method for camera localization within a scene. An image of a scene captured by the camera is input to a machine learning model, which has been trained for the particular scene to detect a plurality of 3D scene landmarks. The 3D scene landmarks are pre-specified in a pre-built map of the scene. The machine learning model outputs a plurality of predictions, each prediction comprising: either a 2D location in the image which is predicted to depict one of the 3D scene landmarks, or a 3D bearing vector, being a vector originating at the camera and pointing towards a predicted 3D location of one of the 3D scene landmarks. Using the predictions, an estimate of a position and orientation of the camera in the pre-built map of the scene is computed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Modern camera localization methods that use image retrieval, feature matching and 3D structure-based pose estimation, require long-term storage of numerous scene images or a large amount of image features. That can make them unsuitable for resource constrained devices and also raises serious privacy concerns. Described herein is a learned camera localization technique that avoids storing image features or a detailed 3D point cloud. A sparse set of scene landmarks is encoded into a machine learned model that can detect the scene landmarks in a query image whenever they are visible. This encoding eliminates the necessity of maintaining an image feature database. In some examples, a machine learned model is trained to regress bearing vectors for such scene landmarks even when they are not within the camera's field-of-view. The predicted scene landmark correspondences yield extremely accurate pose estimates as explained in more detail below.

Camera localization is the task of estimating the 3D position and 3D orientation of a camera from a query image with respect to a pre-built scene map. This task is a fundamental building block to enable virtual reality/augmented reality systems (VR/AR) that allow users to persistently interact with surrounding 3D environments. These environments are often private spaces, e.g., home, where existing localization approaches that leverage image retrieval and feature matching are not privacy-preserving because either images or features must be stored, and stored features can be inverted to reveal sensitive scene content. Further, they require long term storage of numerous images or a vast amount of image features and 3D points in a persistent database. In lifelong localization scenarios, new images and features are continuously added causing it to grow in size over time. The resulting memory footprint may exceed the limits of on-device localization for VR/AR systems.

Learned localization approaches such as absolute pose regression and scene coordinate regression methods implicitly encode scene information in the learned parameters of a model, rather than explicitly storing images or features. Their performance accuracy is, however, not on par with the top performing methods that use image retrieval, feature matching and structure-based pose estimation.

The technology described herein comprises a new learned method for camera localization that preserves privacy, requires low memory footprint, and outperforms existing storage-free pose regression methods.

Figure 1:
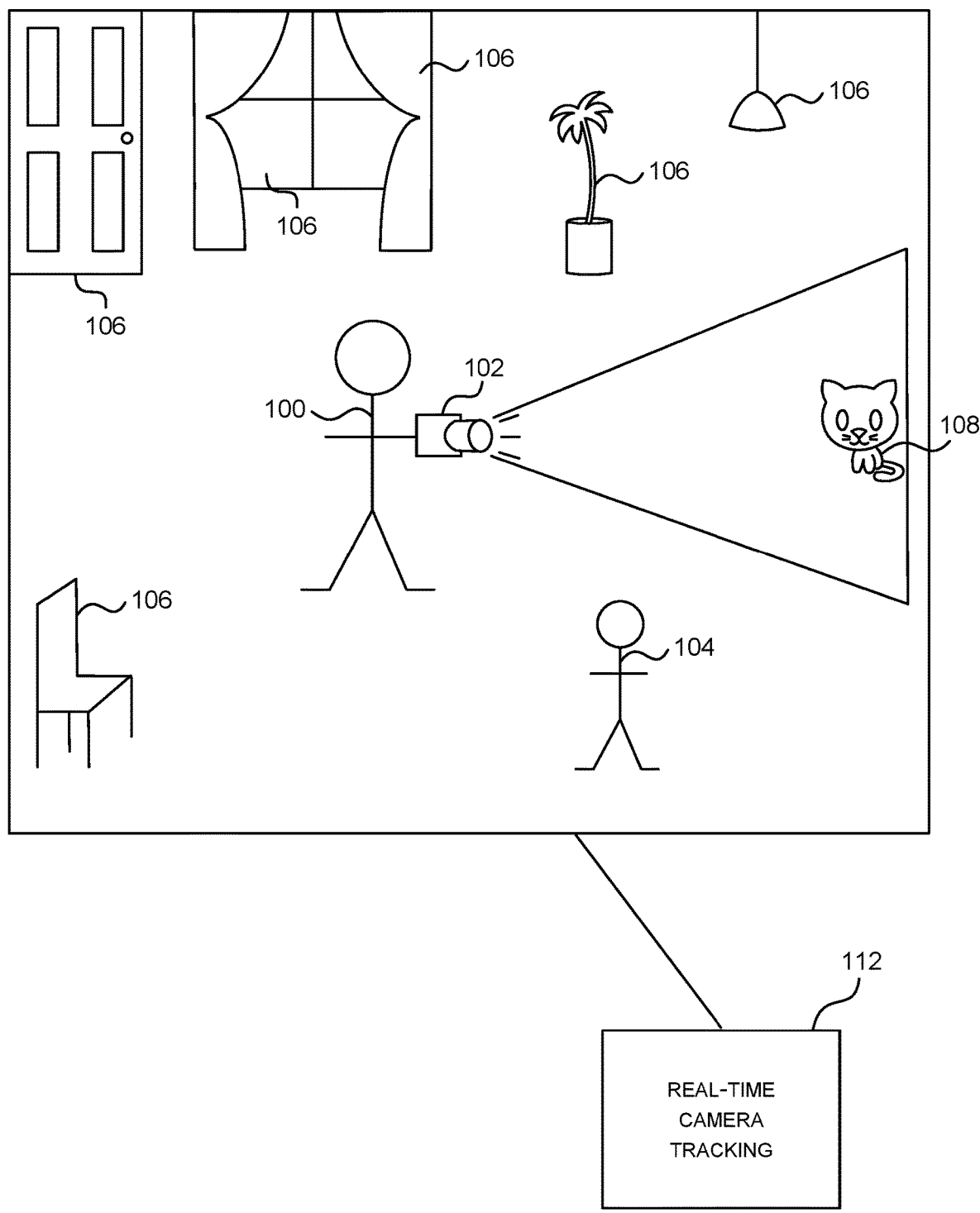
FIG. 1 is a schematic diagram of a person in a room holding a mobile depth camera which may be used for real-time camera tracking and optionally also to produce a 3D model or map of the room.

FIG. 1 is a schematic diagram of a person 100 standing in a room and holding a mobile camera 102 which in this example also incorporates a projector which is projecting the image of a cat 108 into the room. A non-exhaustive list of examples of the mobile camera is: smart phone camera, red green blue camera, depth camera. The room contains various objects 106 such as a chair, door, window, plant, light and another person 104. Many of the objects 106 are static although some of the objects such as person 104 may move. As the person moves around the room the mobile camera captures images which are used by a real-time camera tracking system 112 to monitor the location and orientation of the camera in the room.

The real-time camera tracking system 112 may be integral with the mobile camera 102 or may be at another location provided that it is able to receive communication from the mobile camera 102, either directly or indirectly. For example, the real-time camera tracking system 112 is at a personal computer, dedicated computer game apparatus, or other computing device in the room and in wireless communication with the mobile camera 102. In other examples the real-time camera tracking system 112 is elsewhere in the building or at another remote location in communication with the mobile camera 102 using a communications network of any suitable type.

The real-time camera tracking system 112 tracks the position of the camera in relation to a 3D model or map of the building interior which is not available to the camera or to the real-time camera tracking system 112 during tracking. Thus there is improved security since malicious parties with access to the camera and/or real-time camera tracking system are not able to access the 3D model or map of the building interior or other scene. The real-time camera tracking system 112 uses information about the scene which has previously been encoded in to a machine learning model which is available to the real-time camera tracking system 112.

The outputs of the real-time camera tracking system 112 are used by a game system, mixed reality or other application although that is not essential. For example, a projector at the mobile depth camera 102 is arranged to project images depending on the output of the real-time camera tracking system 112.

Figure 2:
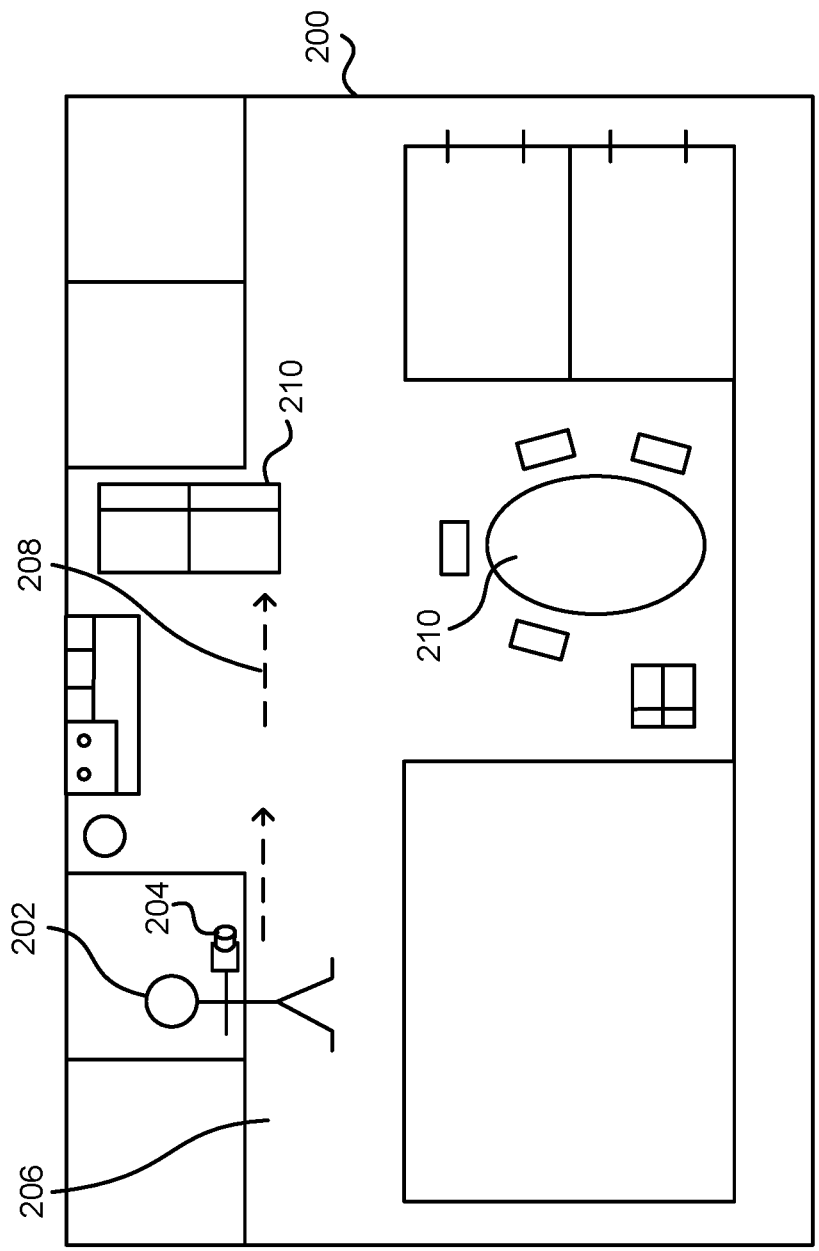
FIG. 2 is a plan view of a floor of a building which is being explored by a person holding a mobile depth camera.

FIG. 2 is a plan view of a floor 200 of a building. A person 202 holding a mobile camera 204 is moving around the floor as indicated by dotted arrows 208. The person walks along a corridor 206 past rooms and furniture 210. The real-time camera tracking system 112 is able to track the position of the mobile camera 204 as it moves using trained machine learning models. It is not essential for a person 202 to carry the mobile camera 204. In other examples the mobile camera 204 is mounted on a robot or vehicle or is part of a head worn computing device. This also applies to the example of FIG. 1.

The real-time camera tracking system 112 uses machine learning model(s) which encode information about pre-specified 3D scene landmarks in the scene that the camera is in.

Figure 3:
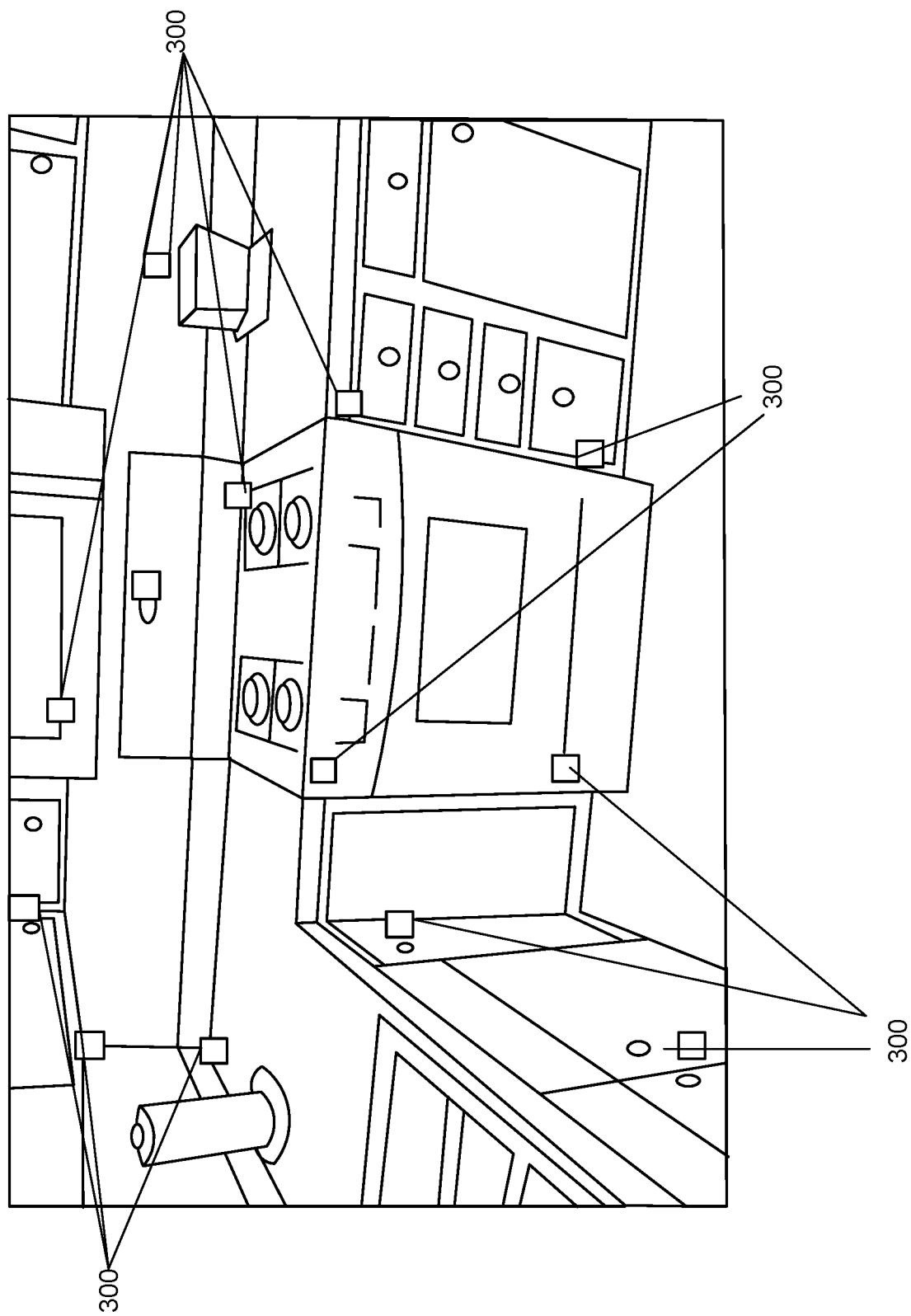
FIG. 3 is a schematic diagram of a query image and showing scene landmarks which have been detected in the query image.

FIG. 3 is a is a schematic diagram of a query image and showing scene landmarks 300 which have been detected in the query image by the machine learning model(s). A query image is an image from the camera and which is input to one or both of the machine learning models. In the example of FIG. 3 the query image depicts an interior of a domestic kitchen and 2D locations of a plurality of the pre-specified 3D scene landmarks are shown as small rectangles.

Using machine learning models which encode information about pre-specified 3D scene landmarks is privacy preserving and requiring low memory footprint as no visual information needs to be stored. The machine learning models establish 2D-3D correspondences that can be, in turn, used to robustly estimate the camera pose using known conventional techniques.

In various examples there is a first machine learning model that detects the 3D scene landmarks, i.e., regresses the 2D coordinates of the landmarks in the input image. The first machine learning model is referred to as a scene landmark detector (SLD).

In a first group of embodiments referred to as Scene Landmark Detection (SLD), a machine learning model is trained to solve the task of identifying 2D locations in the image which depict 3D scene landmarks. Camera intrinsics are known, therefore these 2D detections can be converted into 3D bearing vectors or rays.

In a second group of embodiments referred to as Neural Bearing Estimation (NBE), a different machine learning model is trained to directly predict the 3D bearing vectors for the 3D scene landmarks in camera coordinates. With SLD, only 3D scene landmarks that are visible in the camera's field of view are detected. In contrast, bearings for all landmarks will be predicted with NBE, i.e., even when the 3D scene landmark is occluded or is outside the camera's field of view.

The first and second group of embodiments is now described with reference to FIG. 4.

Figure 4:
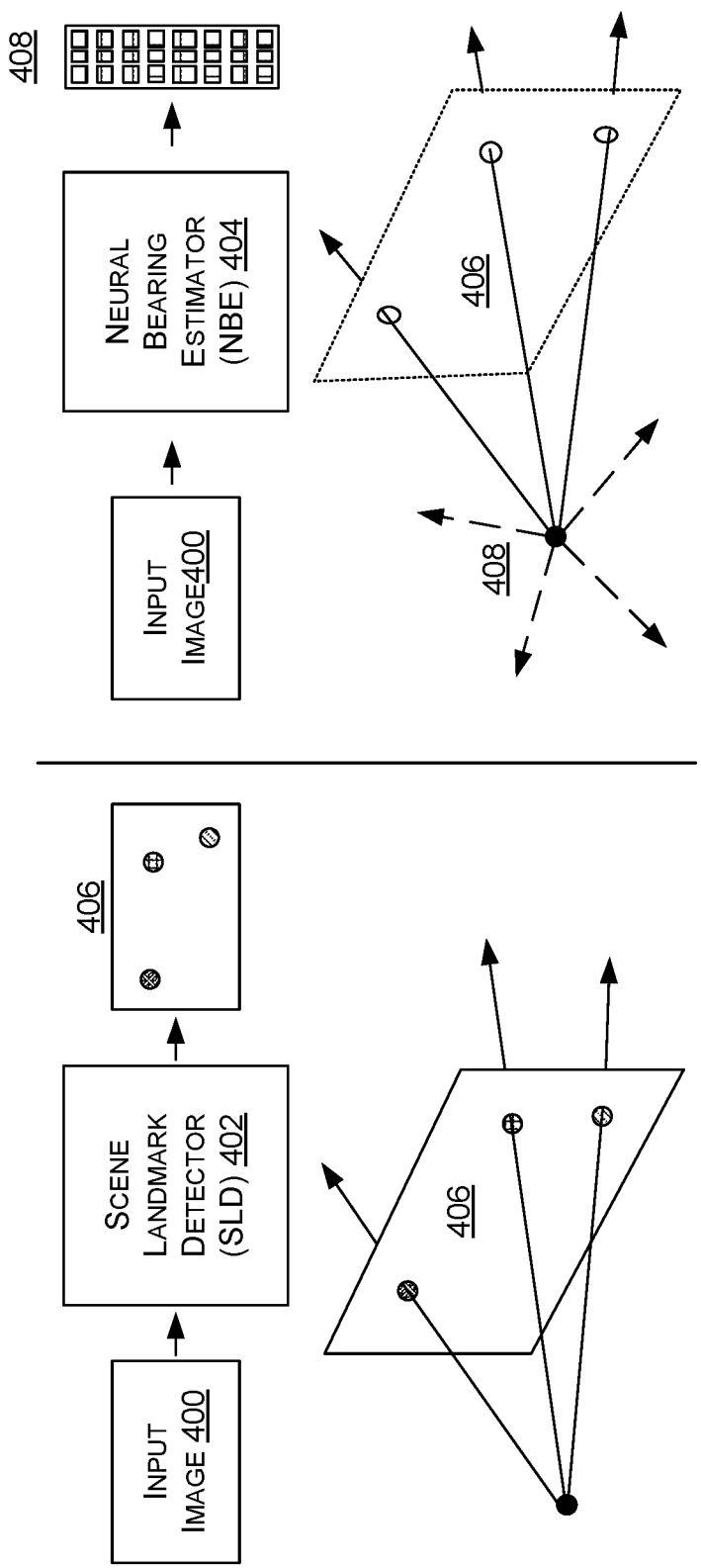
FIG. 4 is a schematic diagram of detecting 2D image locations depicting 3D scene landmarks, and also of predicting 3D bearing vectors.

FIG. 4 is a schematic diagram of detecting 2D image locations depicting 3D scene landmarks, and also of predicting 3D bearing vectors. The left hand side of FIG. 4 shows the scene landmark detector 402 which is a machine learning model. A input image 400 from the camera is input to the scene landmark detector 402. The scene landmark detector computes 2D locations (shown at 406 in FIG. 4) in the input image which are predicted to depict individual ones of the pre-specified 3D scene landmarks. 3D bearing vectors are optionally computed originating from the camera and extending through the 2D locations as indicated in the lower part of the left hand side of FIG. 4.

In order to generate training data to train the machine learning models, structure from motion is applied to mapping images of the scene to select a set of salient 3D scene landmarks and automatically generate the training data necessary to train the architecture. More detail about the training process is given later in this document.

Unlike human pose estimation where most landmarks are expected to be visible (up to occlusion), the majority of scene landmarks are not expected to be visible because of limited field-of-view and sparsity of the scene landmarks. This challenge is mitigated by learning a machine learning model referred to as a Neural Bearing Estimator (NBE) that directly regresses 3D bearing vectors for the scene landmarks in the camera coordinate frame. A 3D bearing vector is a vector originating at the camera and pointing towards one of the pre-specified 3D scene landmarks. NBE learns a global scene representation while learning to predict the direction vectors of scene landmarks even when they are invisible.

FIG. 4 shows the neural bearing estimator 404 which is a machine learning model. The input image 400 from the camera is input to the neural bearing estimator 404 and the neural bearing estimator predicts a plurality of 3D bearing vectors 408. The 3D bearing vectors originate at the camera and some of these point through the input image 400 towards 3D scene landmarks which are depicted in the input image. Others of the 3D bearing vectors point in other directions towards 3D scene landmarks which are not depicted in the input image. In this way the accuracy of the camera pose tracking is high even where 3D scene landmarks are outside the field of view of the camera.

In examples the scene landmark detector 402 and NBE 404 are combined for full pose estimation.

Figure 5:
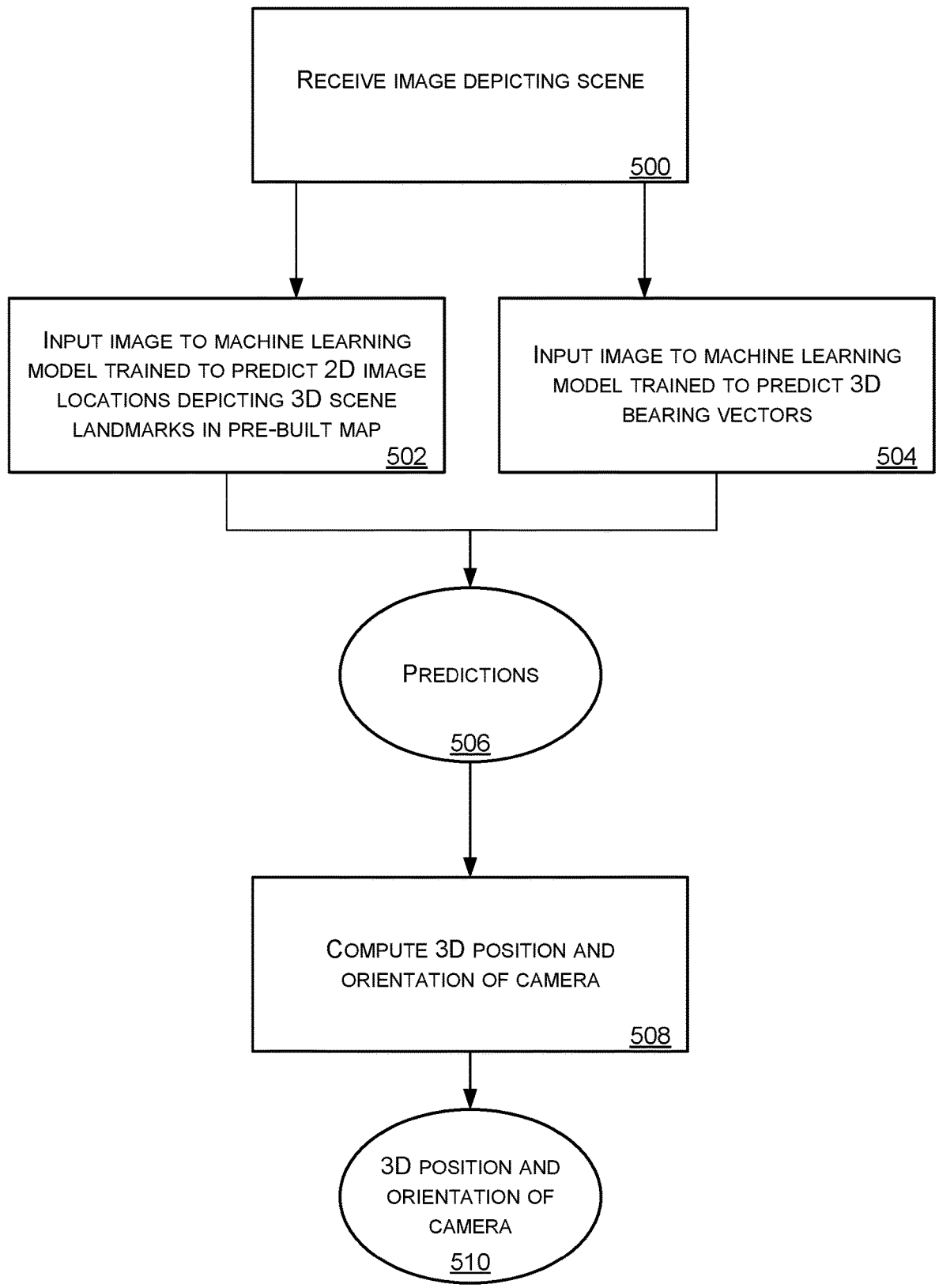
FIG. 5 is a flow diagram of a method of computing 3D position and orientation of a camera.

FIG. 5 is a flow diagram of a method of computing 3D position and orientation of a camera. The method of FIG. 5 is performed by the real-time camera tracking system 112 of FIG. 1.

With reference to FIG. 5, In various embodiments there is a method for camera localization within a scene. An image of a scene captured by the camera is received 500 and is input 502, 504 to a machine learning model, which has been trained for the particular scene to detect a plurality of 3D scene landmarks. The 3D scene landmarks are pre-specified in a pre-built map of the scene.

The machine learning model outputs a plurality of predictions 506, each prediction comprising: either a 2D location in the image which is predicted to depict one of the 3D scene landmarks, or a 3D bearing vector, being a vector originating at the camera and pointing towards a predicted 3D location of one of the 3D scene landmarks.

Using the predictions, an estimate of a position and orientation of the camera in the pre-built map of the scene is computed 508. The method for computing the estimate of position and orientation of the camera from the predictions is well known and involves using geometry and information about the camera parameters. In an example a point 3 point algorithm with random sample consensus is used.

The method is secure as compared with other approaches where images and videos of the scene are stored. In the present method images and videos of the scene are not stored and so are not readily accessible to malicious parties. Often the images and videos of the scene are confidential and/or comprise data which could be used by a malicious party to enter the scene.

The method is suitable for use on resource constrained devices as the memory used by the method is low as compared with alternative approaches where videos and images of the scene are stored in advance and used to make comparisons with the incoming image in order to localize the camera. Once trained, the machine learning model itself is compact and has relatively low memory requirements as compared with storing videos and images of the scene.

The method is extremely accurate and is found to outperform alternative storage-free pose regression methods. The method works even where one or more of the landmarks are not depicted in the image, due to being occluded or outside the field of view of the camera and in this way the accuracy is enhanced. In many cases the method is repeated for images in a stream of images captured at the camera.

In some examples the camera is a mobile camera moving in the scene. Mobile camera localization is significantly more complex than static camera localization and yet the method works well for mobile camera localization or static camera localization. The method is operable in real time; that is, as images are captured by the mobile camera at a frame rate such as 30 frames per second, these are used to compute the camera localization at a generally similar rate.

In some examples the method is carried out on a resource constrained device. A non-exhaustive list of example resource constrained devices for implementing the method is: camera phone, web cam, wearable computer, smart watch, game console, game apparatus, laptop computer, drone, mobile robot.

In some examples, the machine learning model is configured to output the predictions which are the 2D locations in the image and wherein the method further comprises inputting the image to a second machine learning model, the second machine learning model configured to output second predictions as 3D bearing vectors. In this way it is possible to use two different machine learning models in parallel in order to improve accuracy and/or robustness of the camera localization.

In some cases where two different machine learning models are used in parallel, as mentioned in the previous paragraph, the outputs of those models are merged and the merged outputs are used to compute the camera localization as follows. Pairs of the predicted 2D locations and the predicted 3D bearing vectors which relate to a same one of the 3D scene landmarks are determined. From those pairs the predicted 3D bearing vectors are discarded prior to using the predictions to compute the estimate of the position and orientation of the camera. In this way accuracy is increased since the predicted 2D locations are more accurate than the predicted 3D bearing vectors as the predicted 2D locations generally relate to 3D scene landmarks which are depicted in the image (rather than being 3D scene landmarks which are occluded or outside a field of view of the camera).

Preferably the number of the pre-specified 3D landmarks is less than 250. Since the number of landmarks is low the storage capacity used at the resource constrained device is also low (i.e. the size of the machine learning model is low). Despite using a limited number of 3D scene landmarks the method is found to give good accuracy as explained below.

During manufacture the 3D landmarks are automatically determined by selecting a specified number of 3D points in the scene which are the most robust, repeatedly detectable, unique in appearance and generalizable. Selecting the 3D scene landmarks in this way is found to enhance accuracy and/or robustness of the method. Since objects in the scene may move and ambient light in the scene may change over time selecting 3D scene landmarks which are robust, repeatedly detectable, unique in appearance and generalizable is beneficial. Robust landmarks are those which are detected in longer sequences of frames of a video of the scene. Landmarks which are repeatable are seen in multiple episodes of video of the scene. Landmarks which are unique in appearance are ones which are dissimilar to other parts of the scene. Landmarks which are generalizable are landmarks which are observed from many different viewing directions and depths.

In some cases the method comprises computing a saliency score to determine which are the most robust, repeatedly detectable, unique in appearance and generalizable 3D points in the scene. Using a saliency score is found to be an efficient and effective way to enable selecting landmarks.

In some examples the machine learning model comprises a convolutional neural network which has been trained using supervised learning to predict the 2D locations and identity of the 3D landmarks in the image. Using a convolutional neural network is particularly effective and gives a compact model suitable for resource constrained devices.

In some cases where the model comprises a convolutional neural network as described in the previous paragraph, the input image is fed into the convolutional neural network which computes feature maps, and wherein the feature maps are used to predict one heatmap for each 3D landmark, and a transposed convolution layer is used for performing up-sampling and generating a second set of heatmaps for each 3D landmark. This particular architecture is compact and gives accurate results.

In some cases the machine learning model computes the 3D bearing vectors using a plurality of multi-layered perceptrons, one multi-layered perceptron per 3D landmark. The architecture is thus compact and is well suited for predicting 3D bearing vectors, even where the landmarks are not depicted in the image since they are occluded or outside the field of view.

In examples the machine learning model for predicting the 3D bearing vectors has been trained using supervised learning which enables accuracy and robustness.

In examples the machine learning model has been trained using training data comprising observed videos of the scene and exhibiting appearance, illumination and geometric changes. By including variety in the training data, specifically the appearance, illumination and geometric changes, the resulting model is particularly effective in practice.

In examples the observed videos are captured over a time frame during which one or more objects in the scene move or during which ambient light in the scene changes. The resulting model is able to cope with changes in the scene.

In an example the training data is augmented with synthetic videos computed by applying homography and/or intensity changes to the observed videos of the scene. Adding to the training data in this way is found to be extremely effective for improving the generalization ability and accuracy of the method.

Some examples comprise automatically selecting the pre-specified 3D scene landmarks in advance by carrying out object recognition on images or videos depicting the scene, and using rules to place the 3D scene landmarks on recognized objects which are likely to be static according to the rules. Using this type of process to automatically select landmarks gives improved accuracy since the resulting 3D scene landmarks are likely to be static.

Some examples comprise removing one of the pre-specified 3D scene landmarks in response to disappearance of a corresponding pattern in the scene; or adding a pre-specified 3D scene landmark in response to a new salient object appearing in the scene; and retraining the machine learning model. By enabling the method to cope with changes to the scene a method of camera localization is achieved which is robust to changes in the scene over time.

In various examples the machine learning model comprises a first neural network trained using data from multiple scenes and which feeds into additional neural network layers which are scene-specific. By using a neural network architecture with a backbone and then additional scene-specific layers in this way the result is a more compact model, as compared with using separate models for different parts of the scene. Thus resources are saved.

In various examples the scene is a large scene divided into a plurality of overlapping subregions, and where the method comprises using a different plurality of 3D scene landmarks for each subregion and using a different machine learning model for each subregion, using a classifier to classify the image into one of the subregions and inputting the image to the machine learning model associated with the subregion. This approach is particularly effective for large scenes such as a domestic home with several rooms.

In various embodiments there is a method for detecting 3D scene landmarks in images or videos. An image of a scene captured by the camera is input to a machine learning model, which has been trained for the particular scene to detect a plurality of 3D scene landmarks. The 3D scene landmarks are pre-specified in a pre-built map of the scene. The machine learning model outputs a plurality of predictions, each prediction comprising: either a 2D location in the image which is predicted to depict one of the 3D scene landmarks, or a 3D bearing vector, being a vector originating at the camera and pointing towards a predicted 3D location of one of the 3D scene landmarks.

Using a machine learning model to predict pre-specified 3D scene landmarks from an image of the scene enables an apparatus to operate in an unconventional manner to achieve camera localization.

The machine learning model trained to predict 2D locations of 3D scene landmarks, or 3D bearing vectors of the 3D scene landmarks, improves the functioning of the underlying computing device by enabling accurate camera localization on resource constrained devices.

Detailed examples are now given using mathematical notation as follows. In these detailed examples the pre-built map of the scene is a 3D point cloud. However, it is not essential to use a 3D point cloud. The pre-built map of the scene is any 3D model of the scene such as a 3D mesh model, computer aided design model or other 3D model of the scene.

To train SLD and NBE use a 3D point cloud P reconstructed by structure from motion (SfM) using a set of RGB images, $\mathcal{L}=\{I_i\}_{i=1}^{N}$, captured by a pinhole camera, where N is the number of images. Each image I is associated with an operation of camera projection $\pi K, R, t(x)$ that maps the 3D point x to the image coordinate where $R \in SO(3)$ and $t \in \mathbb{R}^3$, and $K \in \mathbb{R}^3$ are the rotation, translation, and intrinsic parameters of the image, respectively. A subset of the 3D point cloud S is selected to form scene landmarks to learn SLD and NBE, $s_\ell \in \subset \mathcal{P}$, where $s_\ell \in \mathbb{R}^3$, is the $\ell$-th landmark. Use the visibility computed by SfM for each image I and denote it as $S_{vis}(I)$. A landmark s is projected onto the camera to form the image projection $u_l = \pi c_{K,R,t}(S_l)$. For a 2D image point u, denote the associated unitized bearing vector in the camera coordinate as:

$$b = \frac{K^{-1}u}{\left\|K^{-1}u\right\|_2} \in \mathbb{S}^2$$

where $\mathbb{S}^2$ denotes points on the unit sphere.

Figure 6:
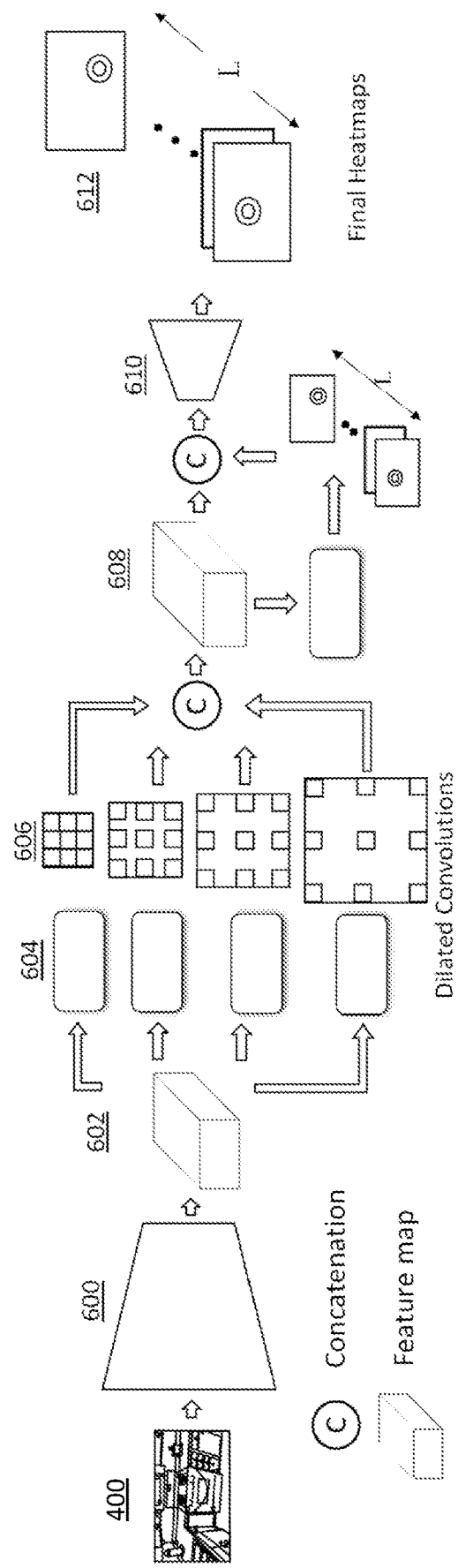
FIG. 6 is a schematic diagram of a machine learning model for predicting 2D image locations depicting 3D scene landmarks.

FIG. 6 is a schematic diagram of a machine learning model for predicting 2D image locations depicting 3D scene landmarks. FIG. 6 shows an architecture for the SLD machine learning model.

Implement the scene landmark detector (SLD) using a convolutional neural network (CNN)-based architecture, that takes an RGB image I as input and outputs a set of pixel likelihood maps being a landmark, or heatmaps, $\{H_\ell I, \Phi) \in [0,1]^{W' \times H'}\}_{l=1}^{L}$, =1 one for each landmark l=1, . . . , L, respectively, where W' and H' are the width and height of the heatmaps. $\Phi$ denotes the learnable CNN parameters, specific to each scene.

The neural network architecture consists of four main components. First, a ResNet-18 backbone 600 is used, where the last three max-pool layers are removed to retain the high resolution feature maps 602, whose resolution is a quarter of the input image 400 resolution. Second, a dilated convolution block 604, 606 is used after the ResNet-18 backbone 602 with dilation rates set to 1, 2, 3, and 4. Next, a transposed convolution layer 608 performs upsampling and it is responsible for generating heatmaps that are half the resolution of the input image 400. The final layer 610 consists of 1×1 convolutions which predicts L heatmap channels 612, one for each landmark $s_\ell \in S$. The architecture is illustrated in FIG. 6.

To train the architecture, use the ground truth heatmap $\hat{H}_\ell$ (I) and employ the mean squared loss:

$$\mathcal{L}_{SLD}(\Phi) = \sum_I \sum_{\ell=1}^{L} \|H_\ell(I, \Phi) - \hat{H}_\ell(I)\|_F^2$$

where $\|\cdot\|$ F denotes the Frobenius norm, $H_\ell$ is obtained by convolving a Dirac delta function at the projected landmark location $u_\ell$ with a 2D Gaussian filter with its standard deviation $\sigma$, and u is the 2D position where landmark $s_l \in S_{VIS}(I)$ is observed in image I. If the landmark 1 is not observed in the image I, set $\hat{H}_\ell$ (I) as a 0 matrix with proper dimension. Assign $\sigma=5$ (pixels) and generate two sets of ground truth heatmaps, at quarter (W'=W/4, H'=H/4) and half (W'=W/2, H'=H/2) resolutions where W and H are the resolution of the image I.

During the inference, consider the detection of a landmark when the maximum heatmap value in its channel exceeds a threshold $\tau=0.2$. The 2D location $\hat{u}_\ell$ is found by computing the expectation over the 17×17 heatmap patch that is cropped around the peak location.

$$\mathbb{E}_{H\ell(I,\Phi)} = \mathbb{E}_{H\ell(I,\Phi)}[u]$$

Figure 7:
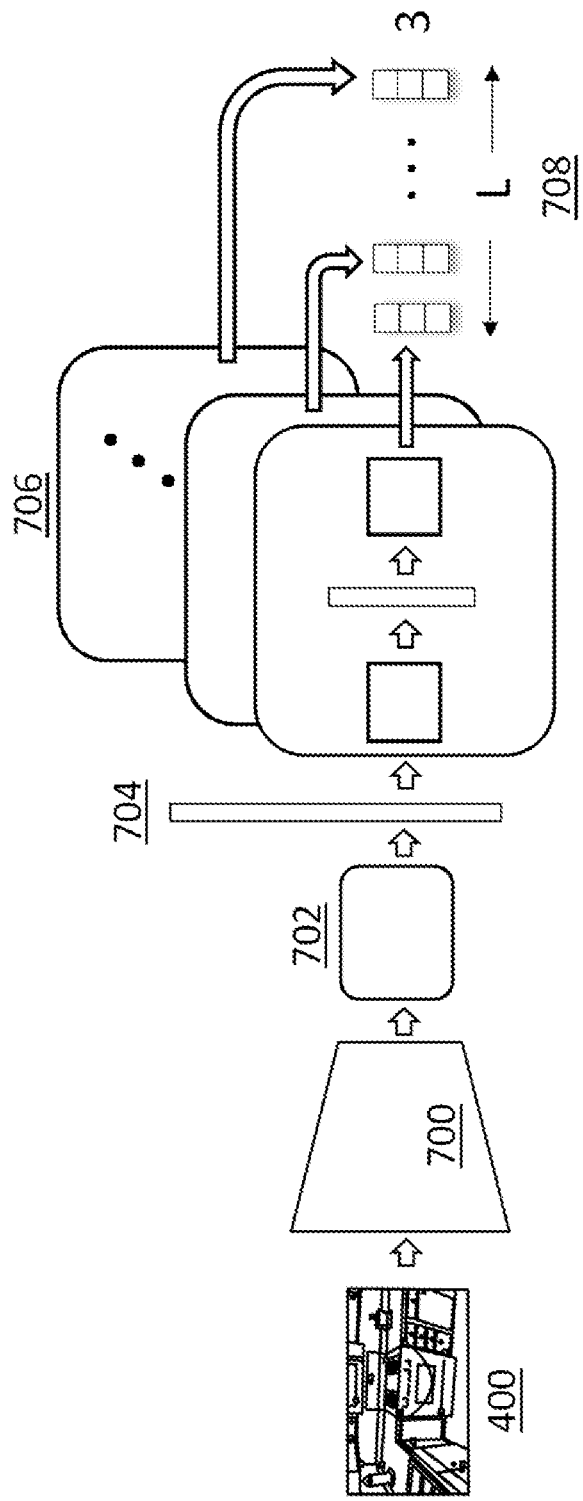
FIG. 7 is a schematic diagram of a machine learning model for predicting 3D bearing vectors.
Figure 8:
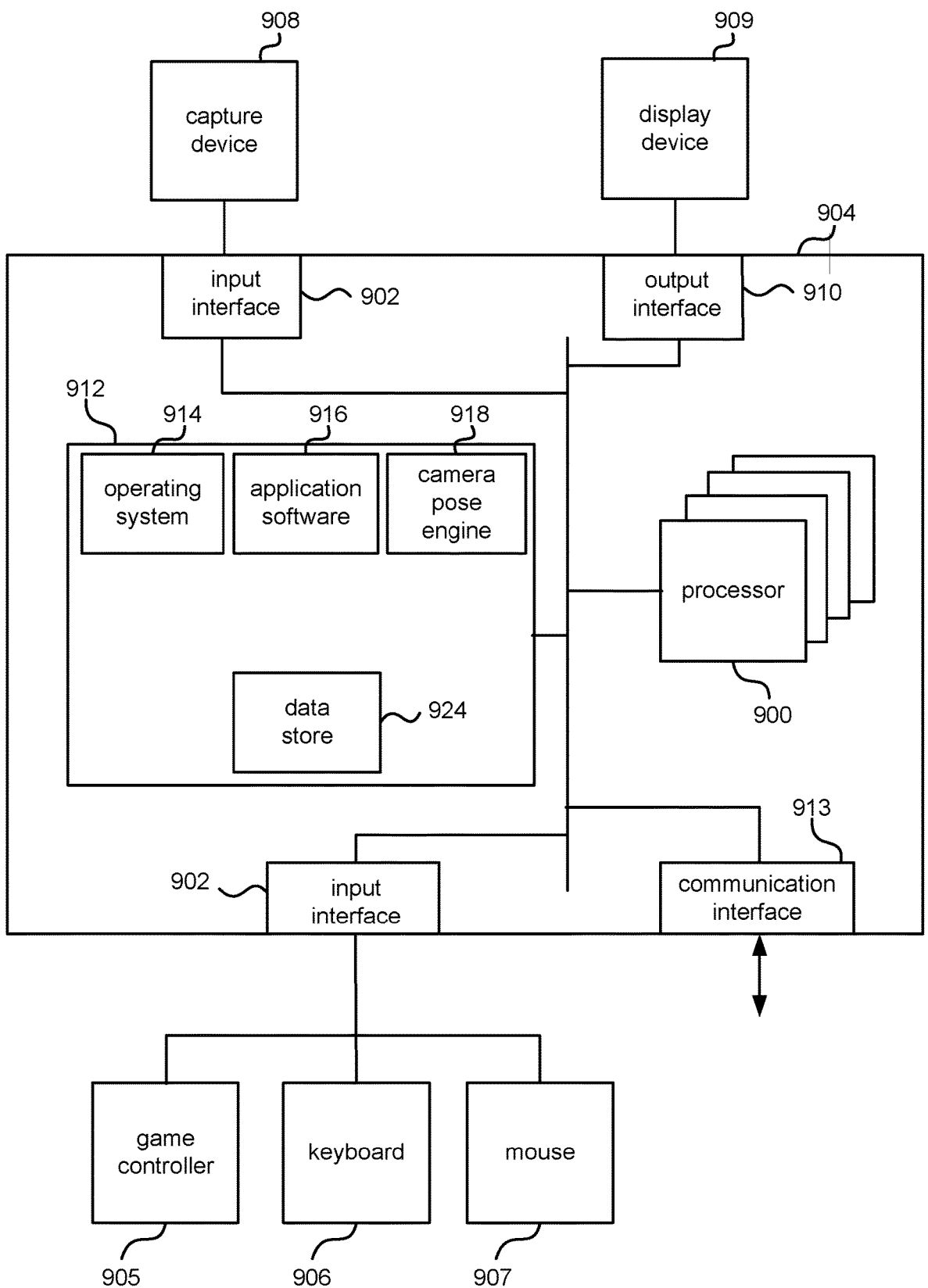
FIG. 8 illustrates an exemplary computing-based device in which embodiments of a real-time camera pose estimation system are implemented.

FIG. 7 is a schematic diagram of a machine learning model (referred to as NBE) for predicting 3D bearing vectors. The NBE model regresses bearing vectors for the full set of scene landmarks, even those which are invisible, given an image I. The NBE model comprises a CNN architecture having a ResNet 18 backbone 700 which takes as input an image I 400 to produce a deep feature map 702. It is then followed by multiple MLP (multi-layer perceptrons) blocks 706, each block outputs a bearing vector 708 towards a landmark $l \in S$. Each MLP 706 consists of 2 hidden fully connected layers, with 128 rectified linear unit (ReLU) activation nodes.

Denote the network parameters as $\Theta$ and each landmark bearing vector prediction as $B_\ell$ (I, $\Theta$)$\in \mathbb{R}^3$. Train the neural network using the ground truth bearing vector $b_\ell$(I) in image I coordinate with the following robust angular loss $L_{ang}$ $$\mathcal{L}_{NBE}(\Theta) = \sum_I \sum_{\ell=1}^{L} \mathcal{L}_{ang}\left(\frac{B_\ell(I, \Theta)}{\|B_\ell(I, \Theta)\|}, b_\ell(I)\right)$$

An example method of camera pose estimation is now given. For each query image, first feed it into the SLD network to obtain 2D detections, from which the process obtains a set of landmark bearings, $B_1$. If more than $\infty(=8)$ landmarks were detected, use a robust minimal solver such as perspective 3 point (P3P) together with random sample consensus (RANSAC), followed by a Levenberg-Marquardt-based nonlinear refinement of the camera pose. Otherwise, feed the same image into the NBE network and obtain predicted bearings $B_2$ after which merge the sets of bearing estimates $B_1$ and $B_2$ to form a new set $B_3$. When a bearing in both sets $B_1$ and $B_2$ refer to the same 3D scene landmark, keep the estimate from $B_1$ since SLD is usually more accurate than NBE. Finally, compute camera pose using the same procedure described above, from the bearings in $B_3$.

Note that, in contrast to other approaches, SLD does not require predict 3D from the image, which makes localization more accurate. In addition, similar to absolute pose regression, NBE also uses global image cues, it, however, predicts a set of landmark bearing vectors corresponding to the set of designated landmarks. Using this parameterization with robust camera pose solver such as P3P, achieves higher generalization than directly predict pose from an image. The parameterization can be incorporated with the SLD predictions and shows significant gain in pose estimation accuracy.

An example method of 3D scene landmark selection is now described. This method is performed during training such as to configure a camera tracker for use in a particular home, office or other scene.

Finding the optimal subset of the L scene landmarks from the SfM point cloud P is a combinatorial problem where evaluating every subset is intractable. Instead, select the scene landmarks that are (a) robust (longer track), (b) repetitive (appears in multiple unique videos in the training set, and (c) generalizable (observed from many different viewing directions and depths). Measure a saliency score s for each 3D point with a track longer than a threshold t, as follows:

$$s = \lambda \log_2(l) + \frac{e}{E} + \min(a, 2) + \min(d, 1)$$

where l is the observation track length, e is the number of unique episodes (videos) the point was observed in, and E is the number of episodes in the training set, a denotes the largest angle in radians formed by any two rays among all visible views where a ray is the line between the 3D point and the position of a camera. $d=\sigma_d/\mu_d$ indicates a normalized depth variation where $\mu_d$ and $\sigma_d$ are the mean and the standard deviation of the depths for track observations. Set t=25 and $\lambda=0.25$.

In addition to maximizing overall saliency score, find the scene landmarks that can spatially best describe 3D point cloud, i.e., uniform point density distribution to cover the whole scene. To that end, use a constrained greedy approach described below as Algorithm 1 which iteratively invokes the routine ConstrainedGreedy($P$, S, r) that considers all 3D points in $P$ with a distance r or more from all the 3D points in S and from amongst those points, selects the point which has the highest saliency score. This point selection approach achieves overall high saliency score while ensuring full scene coverage.

Algorithm 1: Landmark Selection

Input: $P$, L, $r_0$

Output: S

S←{ } and r←$r_0$; // Initialize with large coverage radius do p←ConstrainedGreedy($P$,S,r);

if found a valid point p, then

S←S∪p;

else $$r \leftarrow \frac{r}{2}; // \text{Halve coverage radius to find more points}$$

end
  while |S|<L;

More detail about training the SLD machine learning model is now given. While training SLD, create the batch of data at each iteration by selecting 128 patches of size 96×96 comprising: (i) 64 patches contains at least one visible landmark from the set of landmarks S; (ii) 64 patches that are randomly cropped the set of training images; and (iii) homography and intensity augmentation. The reason behind patch-training and batch-balancing is to discourage the network from ignoring landmarks which are visible in fewer training images. To generate an extended visibility set $S_{vis}(I)$ for each image I, add landmarks visible in any neighboring image whose pose is within 10 cm/10° of that of I. Since the visibility information derived from a structure from motion and multi view stereo pipeline such as COLMAP is highly conservative and may have false negatives. The extended visibility improves the recall.

More detail about an example of training the NBE machine learning model is now given. During the training phase of NBE, split the set of 3D scene landmarks S into visible set $S_{vis}(I)$ and invisible set $S \setminus S_{vis}(I)$ comprising visible and invisible landmarks for each image I, respectively. Weigh the angular loss corresponding to $S_{vis}$ ten times higher than the invisible set. The rationale behind this heuristic is that although the bearing vectors prediction of these two sets of landmarks are correlated, the network has more visual information to predict the landmarks that are likely to be visible compared to ones that are outside the camera field of view and therefore will be invisible.

In an example, implement SLD and NBE architectures and train them in PyTorch, with batch sizes of 32 images and 128 patches respectively, on a single NVIDIA Tesla V100 (trade mark) graphics processing unit (GPU), using the Adam optimizer. Train SLD for 200 epochs. The learning rate (LR) was initially set to $10^{-3}$ and halved every 20 epochs. For NBE, used 100 epochs with an initial LR of $10^{-3}$ which was halved every 10 epochs.

Where NBE and SLD were trained as explained in the previous two paragraphs and have architectures as explained in FIGS. 6 and 7, the following experimental results were obtained when using the following data sets. The experimental results demonstrate the accuracy and working nature of the technology and are not intended to limit the scope of protection.

The technology was evaluated on the public 7-SCENES dataset and a dataset called INDOOR-6. The 7-SCENES dataset consists of multiple Kinect RGB-D 30 frame per second (fps) video captures for each of seven scenes. The videos are split into train/test splits for Chess (4/2), Fire (2/2), Heads (1/1), Office (6/4), Pumpkin (4/2), RedKitchen (7/5), and Stairs (4/2) where (train/test) denotes the number of videos for train and test, respectively, and each video consists of 500-1,000 images at 640 480 resolution. The INDOOR-6 dataset was created from multiple RGB 30 fps videos captured in six indoor scenes over a duration of a few days. Split the data into train/test splits based on video identifiers. The split for each scene are Apmt (24 videos; 6289/799 images), Cabin (12 videos; 3021/284 images), Cottage (18 videos; 4181/315 images), House (4 videos; 1942/272 images), House2 (15 videos; 4946/424 images), and Kitchen (6 videos; 1761/323 images). Ground truth 3D point clouds and camera poses for each scene are created using COLMAP. Comparing to 7-SCENES, each scene in INDOOR-6 is larger (e.g. entire floors of a house/apartment), and the videos were captured over multiple days at different time, including night, to ensure illumination variations.

The estimated pose was evaluated using the rotational and translational errors as:

$$\Delta R = \arccos \frac{Tr(R^T \hat{R}) - 1}{2}, \Delta T = \left\| R^T t - \hat{R}^T \hat{t} \right\|_2$$

where R, t and $\hat{R}$, $\hat{t}$ are the estimated and ground truth camera poses, respectively. Measure the median of $\Delta R$ and $\Delta T$ per scene and the percentage of test images where $\Delta R \leq 5°$ and $\Delta T \leq 5$ cm, respectively.

It was found that the median rotational error and the median translation error were lower for the combined NBE and SLD method as compared with using NBE alone. The percentage of test images within the error bounds mentioned in the previous paragraph was also higher for the combined NBE and SLD method as compared with using NBE alone.

Using NBE, for the apmt scene the median translation error was 22.3 cm, the median rotational error was 4.03 degrees and the percentage of test images within the error bounds mentioned above was 2.

Using the combined NBE and SLD method, for the apmt scene the median translation error was 7.5 cm, the median rotational error was 1.02 degrees and the percentage of test images within the error bounds mentioned above was 33.7.

The method using NBE and SLD was found to outperform alternative storage-free learned methods by a significant margin on all metrics. NBE+SLD also outperforms a storage based method on house and house2. A method combining a storage based method and the SLD model was found to have the best performance on all scenes.

In various embodiments there is a learning based camera localization task where a camera is localized by recognizing a small number of pre-determined scene landmarks whose 3D coordinates are known and then computing the pose using conventional PnP techniques. Modern CNN-based architectures are leveraged to detect scene landmarks accurately and robustly. Experiments on two datasets including a new challenging indoor scene dataset demonstrate the accuracy of the approach. On the new dataset, improved results compared to existing storage-free methods that employ learning are found. Combining 2D-3D correspondences obtained from the SLD and NBE models with the correspondences recovered by classical methods that use retrieval, matching leads to a further boost in accuracy.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

FIG. 9 illustrates various components of an exemplary computing-based device 904 which may be implemented as any form of a computing and/or electronic device, and in which embodiments of a real-time camera tracker may be implemented.

The computing-based device 904 comprises one or more input interfaces 902 arranged to receive and process input from one or more devices, such as user input devices (e.g. capture device 908, a game controller 905, a keyboard 906, a mouse 907). This user input may be used to control software applications or real-time camera tracking. For example, capture device 908 may be a mobile camera arranged to capture images of a scene such as color videos. The computing-based device 904 may be arranged to provide real-time tracking of that capture device 908.

The computing-based device 904 also comprises an output interface 910 arranged to output display information to a display device 909 which can be separate from or integral to the computing device 904. The display information may provide a graphical user interface. In an example, the display device 909 may also act as the user input device if it is a touch sensitive display device. The output interface 910 may also output date to devices other than the display device, e.g. a locally connected printing device.

In some examples the user input devices 905, 907, 908, 909 may detect voice input, user gestures or other user actions and may provide a natural user interface (NUI). This user input may be used to control a game or other application. The output interface 910 may also output data to devices other than the display device, e.g. a locally connected printing device.

The input interface 902, output interface 910, display device 909 and optionally the user input devices 905, 907, 908, 909 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Computer executable instructions may be provided using any computer-readable media that is accessible by computing based device 904. Computer-readable media may include, for example, computer storage media such as memory 912 and communications media. Computer storage media, such as memory 912, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 912) is shown within the computing-based device 904 it will be appreciated that the storage may be distributed or located remotely and accessed via a network or other communication link (e.g. using communication interface 913).

Computing-based device 904 also comprises one or more processors 900 which may be microprocessors, controllers or any other suitable type of processors for processing computing executable instructions to control the operation of the device in order to provide real-time camera tracking. In some examples, for example where a system on a chip architecture is used, the processors 900 may include one or more fixed function blocks (also referred to as accelerators) which implement a part of the method of real-time camera tracking in hardware (rather than software or firmware).

Platform software comprising an operating system 914 or any other suitable platform software may be provided at the computing-based device to enable application software 916 to be executed on the device. Other software than may be executed on the computing device 904 comprises: camera pose engine 918. A data store 924 is provided to store data such as previously received depth maps, registration parameters, user configurable parameters, camera intrinsics, other parameters, 3D models of scenes, game state information, game metadata, map data and other data.

A method for camera localization within a scene, the method comprising:
  receiving, at a processor, an image of a scene, the image captured by the camera;
  inputting the image to a machine learning model, which has been trained for the scene to detect a plurality of 3D scene landmarks, wherein the 3D scene landmarks are specified in a pre-built map of the scene, and receiving as output from the machine learning model a plurality of predictions, each prediction comprising: either a 2D location in the image which is predicted to depict one of the 3D scene landmarks, or
  a 3D bearing vector, being a vector originating at the camera and pointing towards a predicted 3D location of one of the 3D scene landmarks; using the predictions, computing an estimate of a position and orientation of the camera in the pre-built map of the scene.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method for camera localization within a scene, the method comprising:
receiving, at a processor, an image of a scene, the image captured by the camera;
inputting the image to a machine learning model which has been trained for the scene to detect a plurality of 3D scene landmarks, wherein the 3D scene landmarks are specified in a map of the scene, and receiving as output from the machine learning model a plurality of predictions, each prediction comprising a predicted 3D bearing vector originating at the camera and pointing towards a predicted 3D location of one of the 3D scene landmarks; and
using the predictions, computing an estimate of a position and orientation of the camera in the map of the scene.

2. The method of claim 1 wherein the camera is a mobile camera moving in the scene.

3. The method of claim 1 wherein the machine learning model has been trained by denoting for a 2D image point corresponding to a landmark, an associated unitized bearing vector in the camera coordinate as a point on a unit sphere.

4. The method of claim 1 wherein the method further comprises inputting the image to a second machine learning model, the second machine learning model configured to output predicted 2D locations in the image.

5. The method of claim 4 comprising determining pairs of the predicted 2D locations and the predicted 3D bearing vectors which relate to a same one of the 3D scene landmarks, and discarding the predicted 3D bearing vectors from the determined pairs prior to using the predictions to compute the estimate of the position and orientation of the camera.

6. The method of claim 1 wherein a number of the specified 3D landmarks is less than 250.

7. The method of claim 1 comprising automatically selecting the specified 3D landmarks in advance by selecting a specified number of 3D points in the scene which are the most robust, repeatedly detectable, unique in appearance, and generalizable.

8. The method of claim 7 comprising computing a saliency score to determine which are the most robust, repeatedly detectable, unique in appearance and generalizable 3D points in the scene.

9. The method of claim 1 wherein the machine learning model comprises a convolutional neural network which has been trained using supervised learning to predict the predicted 3D bearing vectors.

10. The method of claim 4 wherein the second machine learning model comprises a convolutional neural network and the input image is input into the convolutional neural network which computes feature maps, and wherein the feature maps are used to predict one heatmap for each 3D landmark, and a transposed convolution layer is used for performing up-sampling and generating a second set of heatmaps for each 3D landmark.

11. The method of claim 1 wherein the machine learning model computes the 3D bearing vectors using a plurality of multi-layered perceptrons, one multi-layered perceptron per 3D landmark.

12. The method of claim 11 wherein the machine learning model has been trained using supervised learning.

13. The method of claim 1 wherein the machine learning model has been trained using training data comprising observed videos of the scene and exhibiting appearance, illumination and geometric changes.

14. The method of claim 13 wherein the observed videos are captured over a time frame during which one or more objects in the scene move or during which ambient light in the scene changes.

15. The method of claim 13 wherein the training data is augmented with synthetic videos computed by applying homography and/or intensity changes to the observed videos of the scene.

16. The method of claim 1 comprising automatically selecting the specified 3D scene landmarks in advance by carrying out object recognition on images or videos depicting the scene, and using rules to place the 3D scene landmarks on recognized objects which are likely to be static.

17. The method of claim 1 further comprising:
   removing one of the specified 3D scene landmarks in response to disappearance of a corresponding pattern in the scene or adding a new specified 3D scene landmark in response to a new salient object appearing in the scene; and
   retraining the machine learning model.

18. The method of claim 1 wherein the machine learning model comprises a first neural network trained using data from multiple scenes and which feeds into additional neural network layers which are scene-specific.

19. The method of claim 1 wherein the scene is a large scene divided into a plurality of overlapping subregions, and where the method comprises using a different plurality of 3D scene landmarks for each subregion and using a different machine learning model for each subregion, using a classifier to classify the image into one of the subregions and inputting the image to the machine learning model associated with the subregion.

20. An apparatus for camera localization within a scene, the apparatus comprising a processor executing instructions from a non-transitory machine readable storage medium, the instructions being for:
   receiving an image of a scene, the image captured by the camera;
   executing first and second machine learning models, each of the machine learning models receiving the image as input and each of the machine learning models having been trained for the scene to detect a plurality of 3D scene landmarks, wherein the 3D scene landmarks are specified in a map of the scene;
   receiving as output from the first machine learning model a first plurality of predictions and from the second machine learning model a second plurality of predictions, wherein each of the predictions of the first plurality of predictions and the second plurality of predictions indicates a location of one of the 3D scene landmarks; and
   using the first plurality of predictions and the second plurality of predictions, computing an estimate of a position and orientation of the camera in the map of the scene.

* * * * *